United States Patent
Ye et al.

(10) Patent No.: US 12,540,690 B2
(45) Date of Patent: Feb. 3, 2026

(54) CABLE ANCHORING SYSTEM

(71) Applicant: CommScope Technologies LLC, Hickory, NC (US)

(72) Inventors: Junyu Ye, Heverlee (BE); Chien-An Chen, Holly Springs, NC (US); Barry Wayne Allen, Siler City, NC (US)

(73) Assignee: CommScope Technologies LLC, Claremont, NC (US)

( * ) Notice: Subject to any disclaimer, the term of this patent is extended or adjusted under 35 U.S.C. 154(b) by 265 days.

(21) Appl. No.: 18/338,793

(22) Filed: Jun. 21, 2023

(65) Prior Publication Data

US 2023/0407995 A1 Dec. 21, 2023

Related U.S. Application Data

(60) Provisional application No. 63/353,979, filed on Jun. 21, 2022.

(51) Int. Cl.
*F16L 3/127* (2006.01)
*F16L 3/137* (2006.01)
*F16M 13/02* (2006.01)

(52) U.S. Cl.
CPC ............. *F16L 3/127* (2013.01); *F16L 3/137* (2013.01); *F16M 13/02* (2013.01)

(58) Field of Classification Search
CPC .......... F16L 3/137; F16L 3/127; G02B 6/444; F16M 13/02; H02G 15/007
See application file for complete search history.

(56) References Cited

U.S. PATENT DOCUMENTS

| | | | | |
|---|---|---|---|---|
| 5,793,920 | A | * | 8/1998 | Wilkins ............... G02B 6/4447 385/136 |
| 8,989,550 | B2 | * | 3/2015 | Allen .................. G02B 6/4454 385/135 |
| 9,465,180 | B2 | | 10/2016 | Marmon et al. |
| 9,753,239 | B2 | | 9/2017 | Allen et al. |
| 10,976,513 | B2 | | 4/2021 | Allen et al. |
| 11,287,596 | B2 | | 3/2022 | Allen |
| 11,619,795 | B2 | | 4/2023 | Allen et al. |
| 2012/0318933 | A1 | * | 12/2012 | Kimbrell ............ G02B 6/4471 248/56 |
| 2013/0294739 | A1 | * | 11/2013 | Allen .................. G02B 6/4454 385/135 |
| 2017/0003467 | A1 | * | 1/2017 | Jaksons ............ G02B 6/44524 |
| 2021/0255409 | A1 | * | 8/2021 | Geens ................. G02B 6/4444 |

* cited by examiner

*Primary Examiner* — Thomas A Hollweg
(74) *Attorney, Agent, or Firm* — Merchant & Gould P.C.

(57) ABSTRACT

The present disclosure relates to a cable anchoring system for securing a cable to another structure such as a bracket of an enclosure. The cable anchoring system includes a cable anchoring body and an anchoring attachment slidably mounted within a slot of the cable anchoring body.

15 Claims, 16 Drawing Sheets

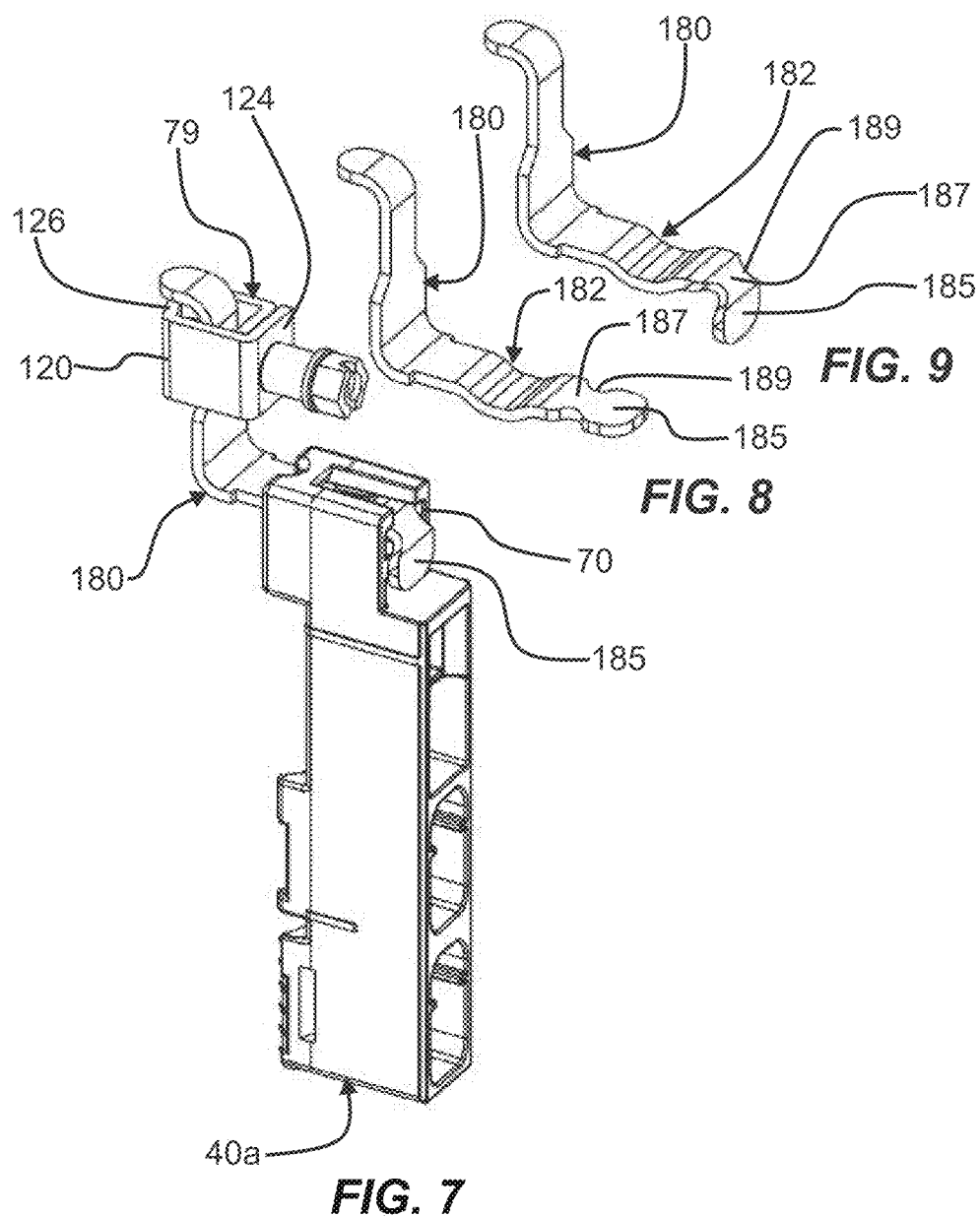

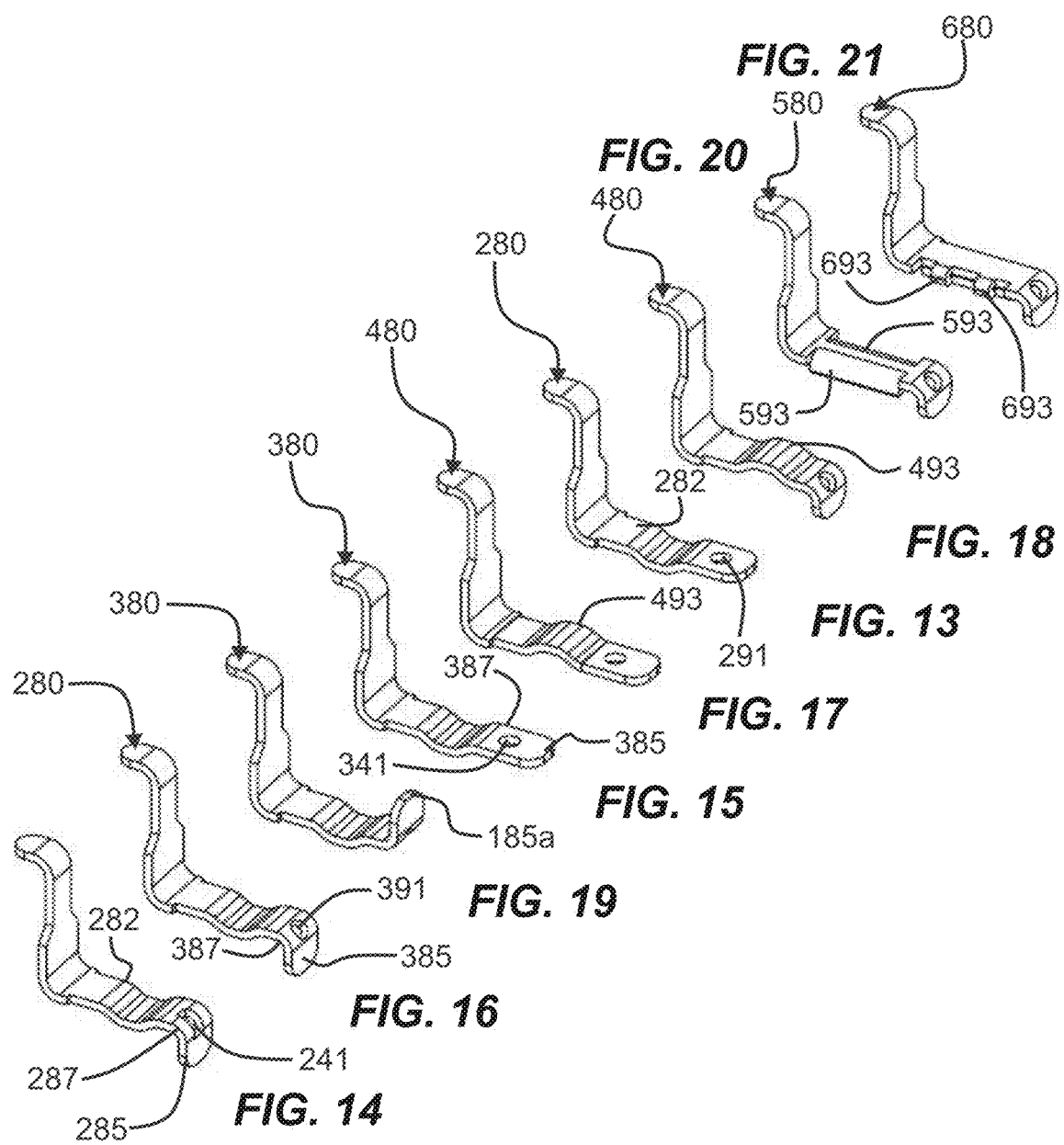

CABLE ANCHORING SYSTEM

CROSS-REFERENCE TO RELATED APPLICATIONS

This application claims priority to U.S. Provisional Application No. 63/353,979 filed on Jun. 21, 2022, which is incorporated herein by reference in its entirety.

TECHNICAL FIELD

The present disclosure relates to systems for anchoring cables such as fiber optic telecommunication cables to structures such as enclosures.

BACKGROUND

Telecommunications system typically employ a network of telecommunications cables capable of transmitting large volumes of data and voice signals over relatively long distances. Telecommunications cables can include fiber optic cables, electrical cables, or combinations of electrical and fiber optic cables. A typical telecommunications network also includes a plurality of telecommunications enclosures integrated throughout the network of telecommunications cables. The telecommunications enclosures or "closures" are adapted to house and protect telecommunications components such as splices, termination panels, power splitters, and wave division multiplexers.

Telecommunications cables are typically routed to telecommunications enclosures in a telecommunications network. The telecommunications cables often enter the enclosures at sealed cable passthrough locations. It is desirable to anchor the telecommunications cables relative to the enclosures such that loading applied to the cables from outside the enclosures is transferred to the enclosures rather than to components within the enclosures to which optical fibers or electrical conductors of the cables connect. The loading is typically transferred from the enclosures to structures to which the enclosures mount (e.g., walls, strands, poles, etc.).

SUMMARY

Aspects of the present disclosure relate to cable anchoring systems. In certain examples, the cable anchoring systems include attachments that are adjustable to accommodate cables of different sizes. In certain examples, the attachments include resiliently deformable features that minimize play and provide enhanced friction for retaining the attachments in adjusted positions. In certain examples, the attachments include stop features for limiting a range of sliding motion of the attachments and for retaining the attachments to other cable anchoring structures. In certain examples, the stop features can include snap-fit features that elastically move to a retention position or inelastically deformed features that are bent beyond their elastic limits to retention positions.

A variety of additional inventive aspects will be set forth in the description that follows. The inventive aspects can relate to individual features and to combinations of features. It is to be understood that both the forgoing general description and the following detailed description are exemplary and explanatory only and are not restrictive of the broad inventive concepts upon which the examples disclosed herein are based.

BRIEF DESCRIPTION OF THE DRAWINGS

The accompanying drawings, which are incorporated in and constitute a part of the description, illustrate several aspects of the present disclosure. A brief description of the drawings is as follows:

FIG. 7 depicts an alternative adjustable attachment shown secured within the one of the cable anchoring bodies of FIG. 3;

FIG. 8 depicts the adjustable attachment of FIG. 7 with a stop tab in an insertion position;

FIG. 9 depicts the adjustable attachment of FIG. 7 with the stop tab bent to a retaining position;

FIG. 13 depicts another adjustable attachment in accordance with the principles of the present disclosure with a stop tab in an insertion position;

FIG. 14 depicts the adjustable attachment of FIG. 13 with the stop tab bent to a retaining position;

FIG. 15 depicts another adjustable attachment in accordance with the principles of the present disclosure with a stop tab in an insertion position;

FIG. 16 depicts the adjustable attachment of FIG. 15 with the stop tab bent to a retaining position;

FIG. 17 depicts another adjustable attachment in accordance with the principles of the present disclosure with a stop tab in an insertion position;

FIG. 18 depicts the adjustable attachment of FIG. 17 with the stop tab bent to a first retaining position;

FIG. 19 depicts the adjustable attachment of FIG. 17 with the stop tab bent to an alternative second retaining position;

FIG. 20 depicts another adjustable attachment in accordance with the principles of the present disclosure with a stop tab bent to a retaining position;

FIG. 21 depicts another adjustable attachment in accordance with the principles of the present disclosure with a stop tab bent to a retaining position;

DETAILED DESCRIPTION

Figure 1:
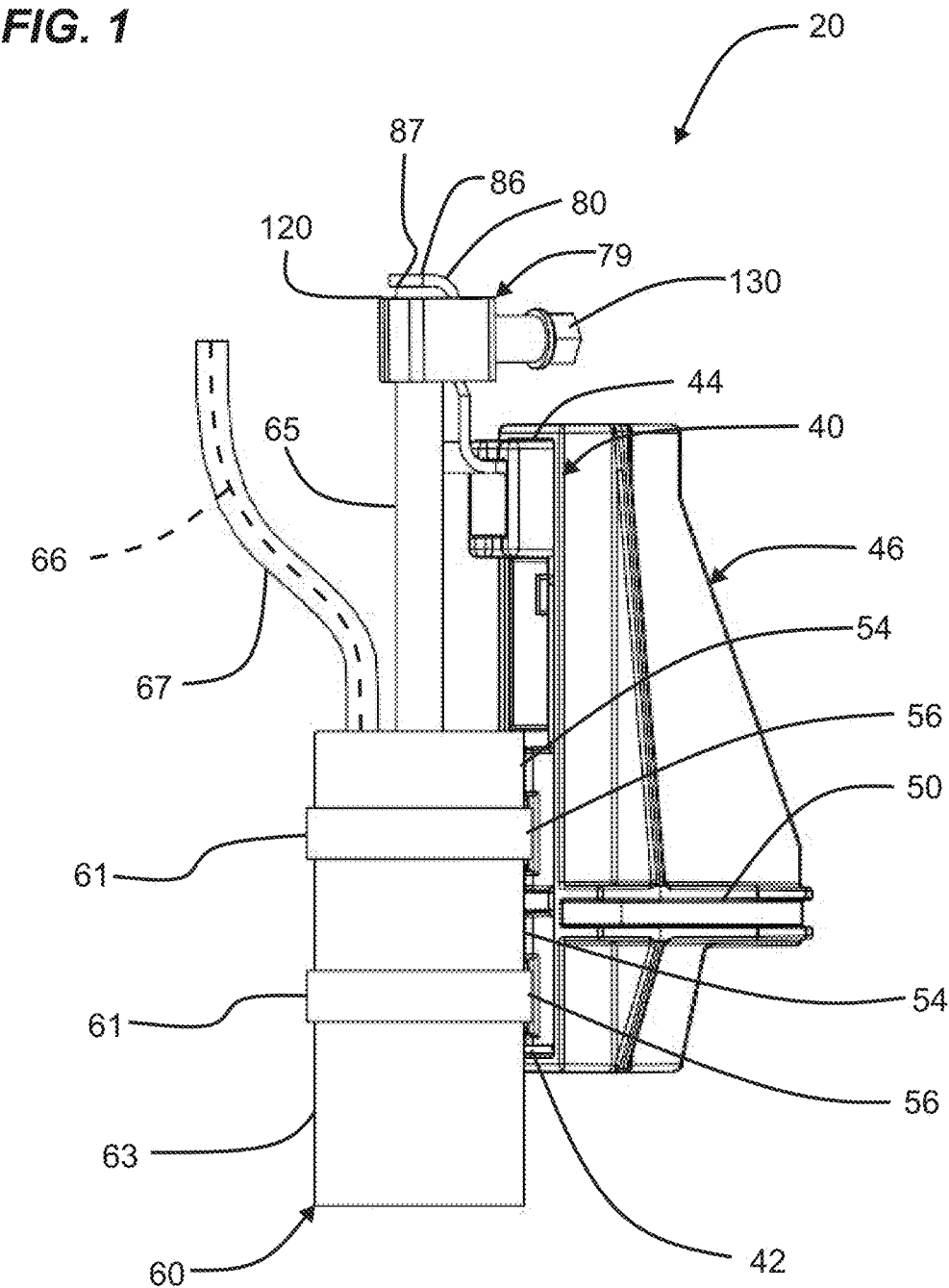
FIG. 1 depicts a cable anchoring system in accordance with the principles of the present disclosure.
Figure 5A:
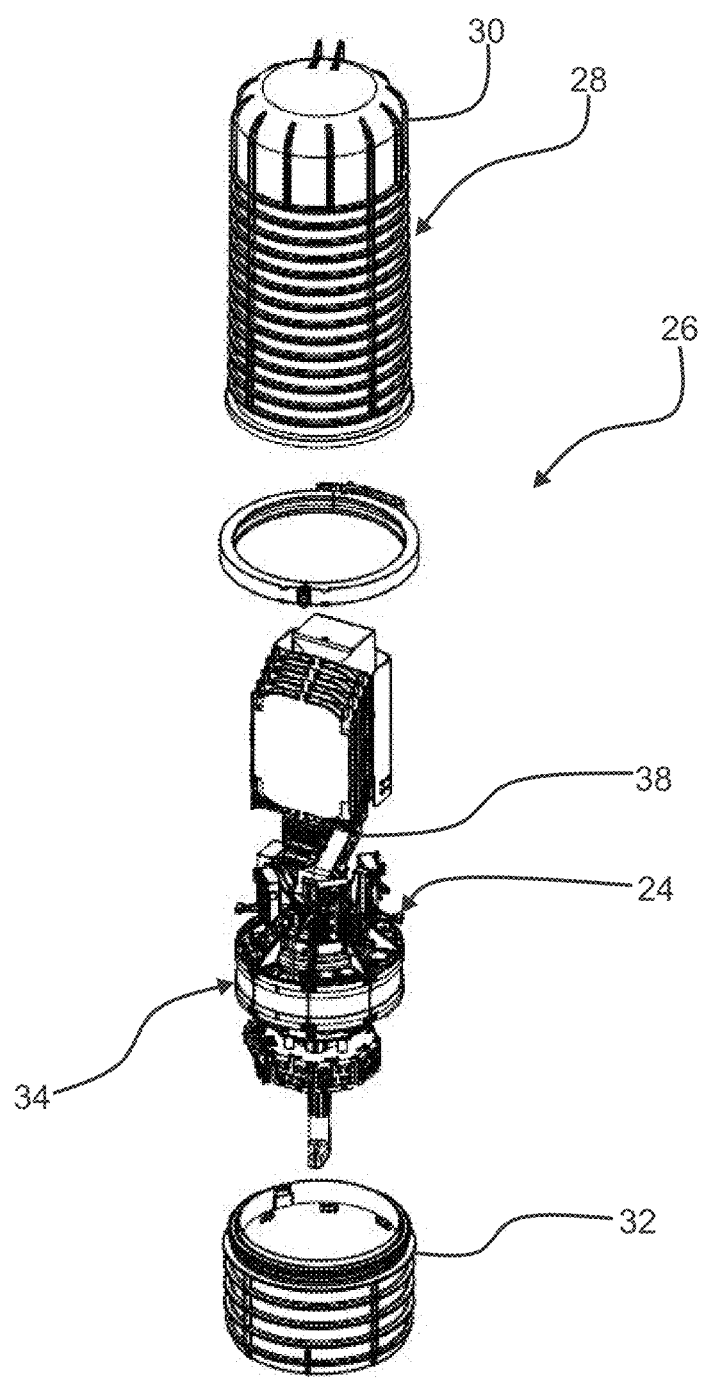
FIG. 5A is an exploded view of an example enclosure in which the cable anchoring system of FIG. 1 can be used to anchor cable to the enclosure.
Figure 5B:
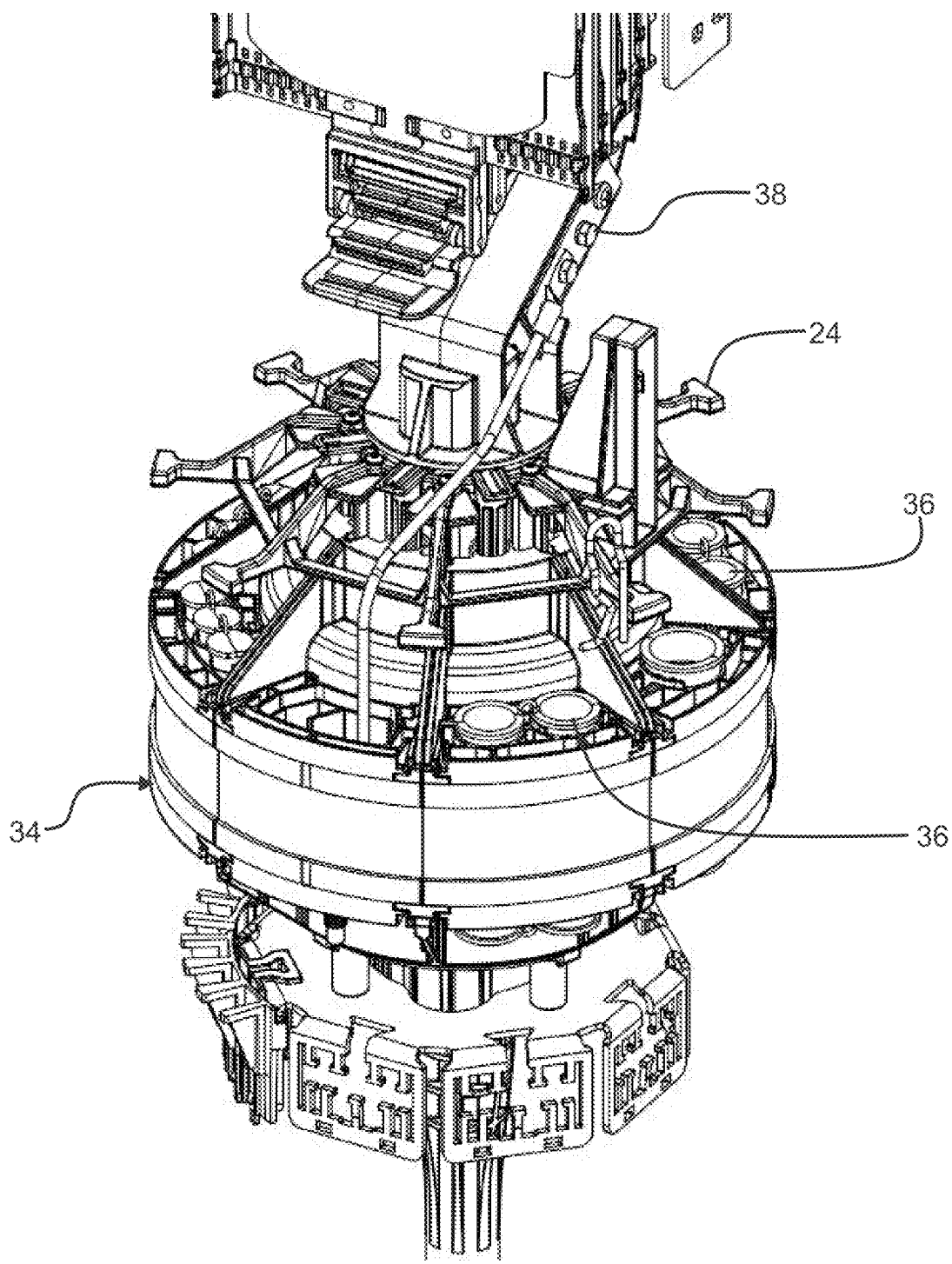
FIG. 5B is an enlarged view of a cable anchoring portion of FIG. 5A.

FIG. 1 depicts a cable anchoring system 20 in accordance with the principles of the present disclosure for securing a cable 60 to another structure (e.g., an enclosure). In one example, the cable anchoring system 20 can be mounted at a mounting location provided within a telecommunication enclosure. For example, the cable anchoring system can be mounted at a mounting location 22 of a cable anchoring bracket 24 (see FIG. 6A.) that can be incorporated within an enclosure. An example enclosure 26 in which the cable anchoring bracket 24 is incorporated is depicted at FIGS. 5A and 5B. The enclosure 26 includes a housing 28 having a cover 30 (e.g., a dome) and a base 32. A sealing unit 34 fits and seals within the base 32. The sealing unit 34 defines cable pass-through locations 36 for sealing about cables routed into the interior of the housing 28. The enclosure 26 includes a tower 38 for supporting components such as trays for managing optical fibers and for supporting optical components such as optical splices, passive optical power splitters, optical taps and wavelength division multiplexers. As shown at FIG. 5B, the cable anchoring bracket 24 mounts within the housing 28 above the sealing unit 34 for anchoring cables routed through the sealing unit 34 relative to the housing 28.

Figure 3:
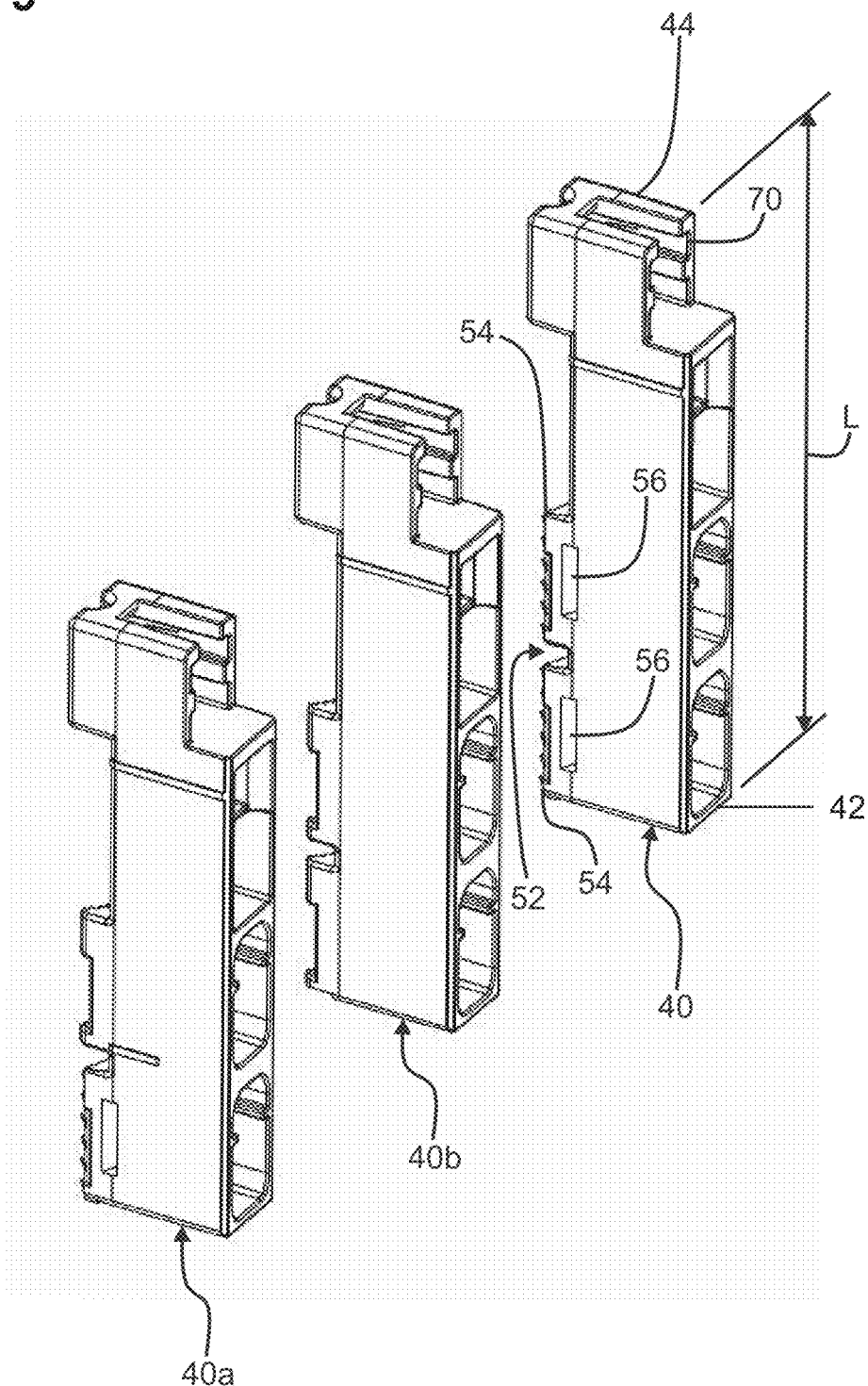
FIG. 3 is a perspective view of different types of cable anchoring bodies of the cable anchoring system of FIG. 1 to which the adjustable attachment of FIG. 2 can be adjustably attached.
Figure 6A:
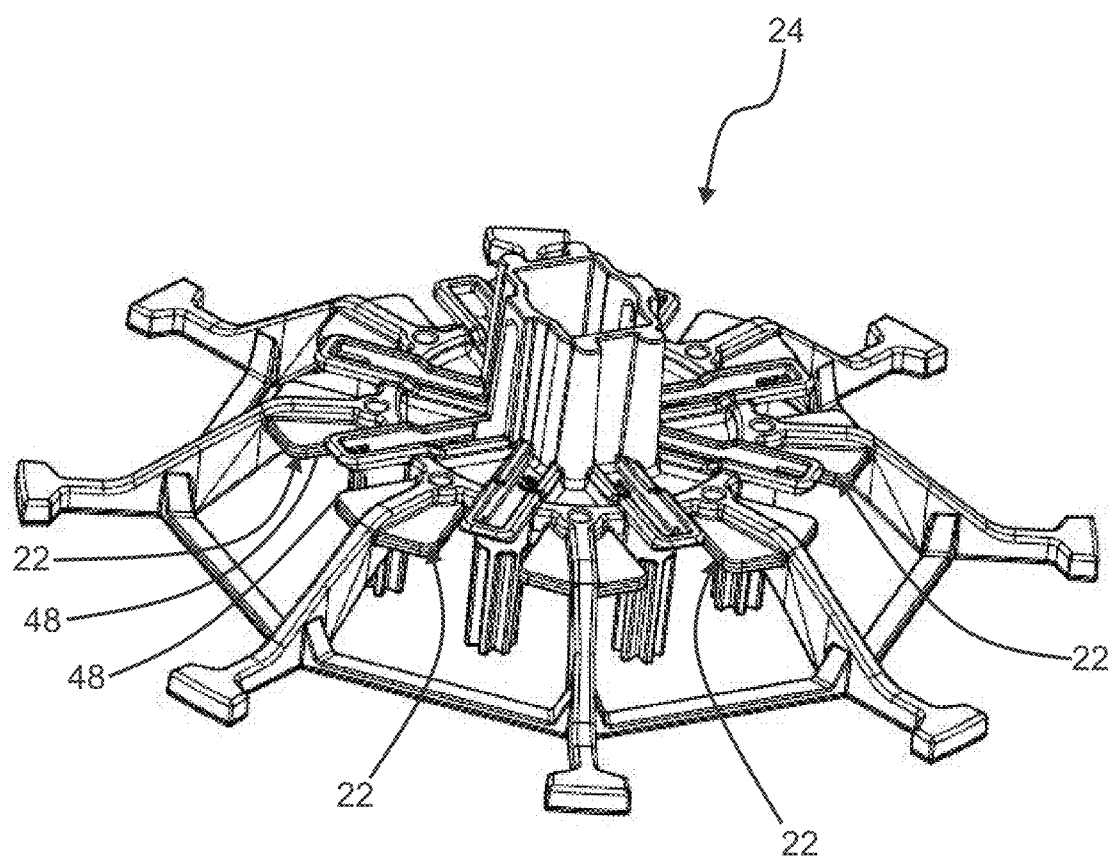
FIG. 6A is a perspective view of an example anchoring structure depicted as a bracket incorporated in the enclosure of FIG. 5A, the bracket defines mounting locations for mounting cable anchoring systems such as the cable anchoring system of FIG. 1.
Figure 6B:
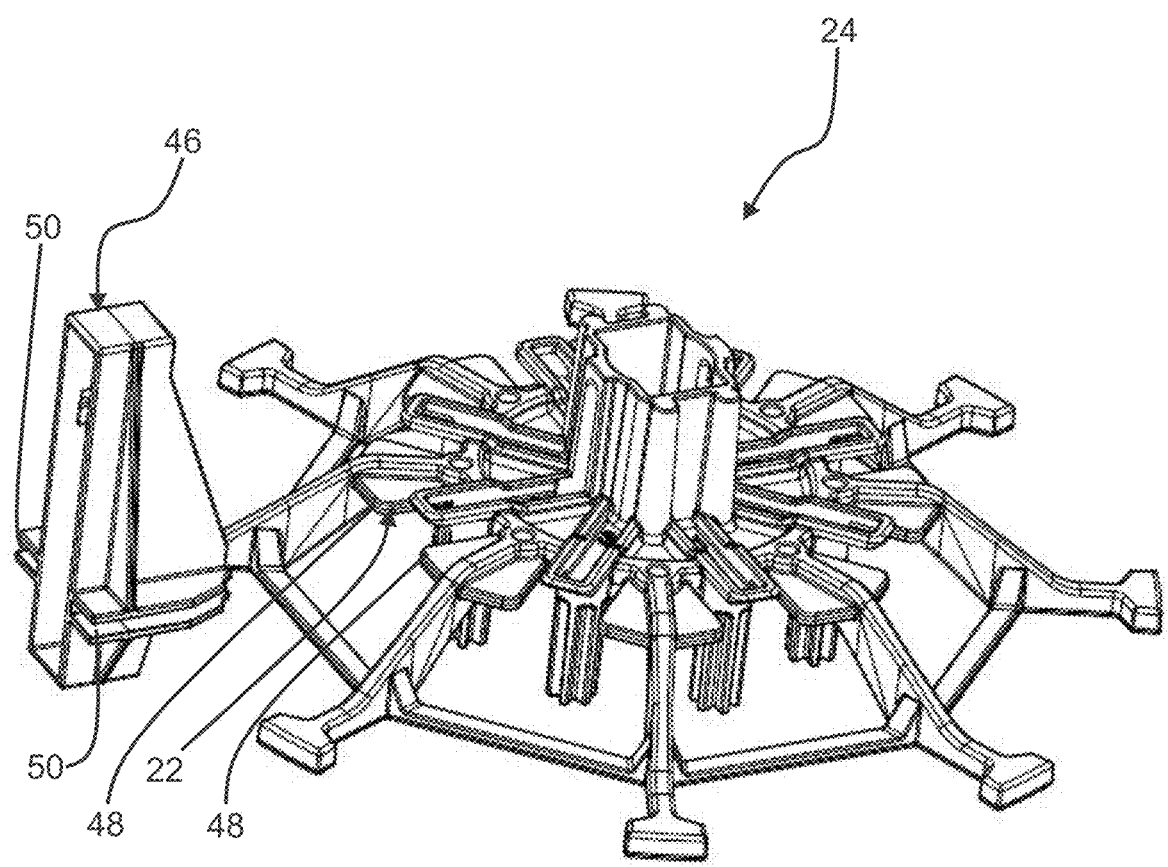
FIG. 6B depicts a mounting interface of the cable anchoring system of FIG. 1 aligned with one of the mounting location of the bracket of FIG. 6A.
Figure 6C:
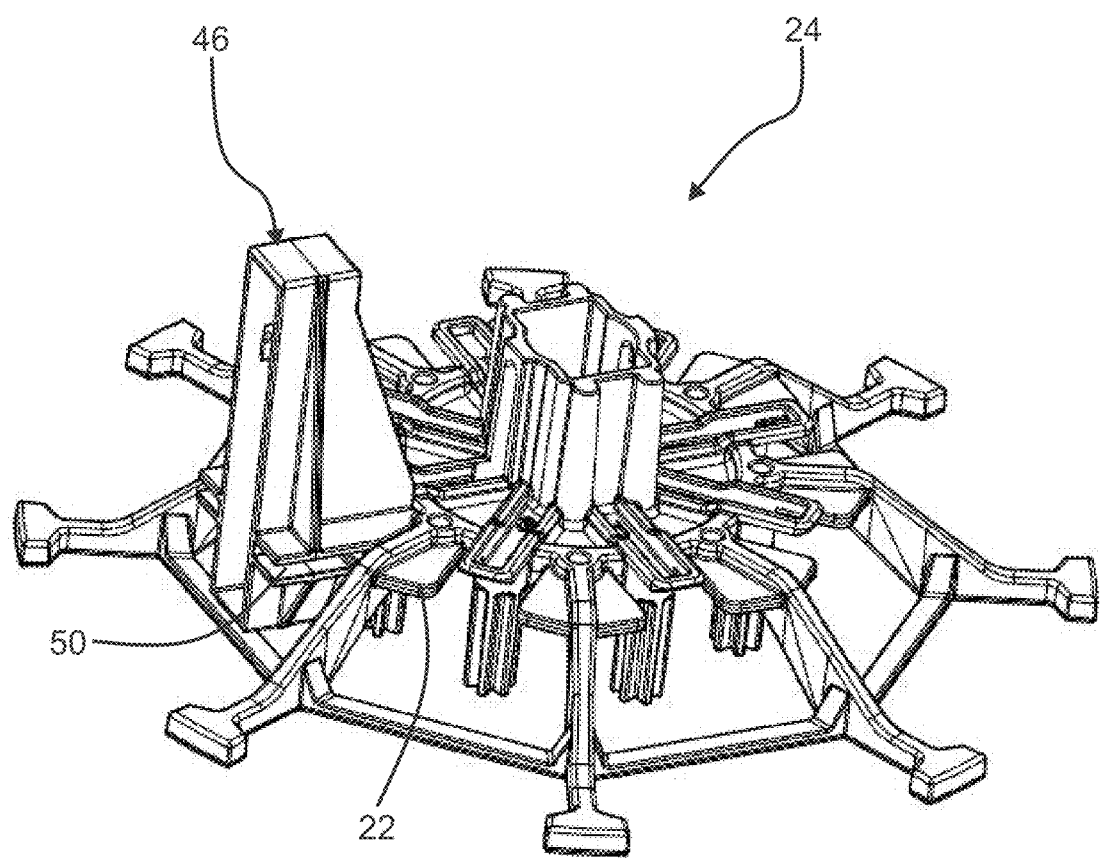
FIG. 6C depicts the mounting interface secured at the mounting location of the bracket of FIG. 6A.
Figure 10:
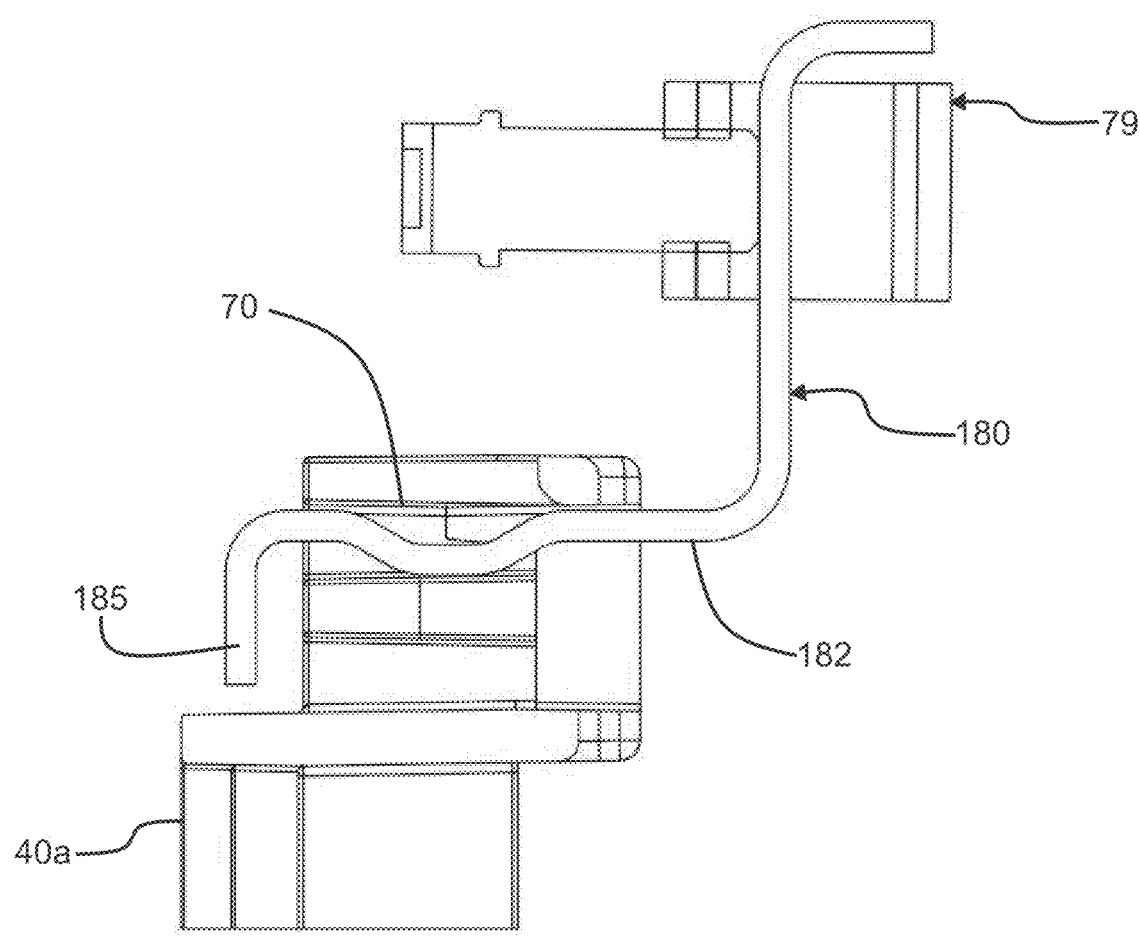
FIG. 10 is a partial cross-sectional view depicting a slidable adjustment interface defined between the adjustable attachment of FIG. 7 and the cable anchoring body of FIG. 3.

Referring to FIGS. 1 and 3, the cable anchoring system 20 includes a cable anchoring body 40 that is elongate along a length L that extends between first and second opposite ends 42, 44 of the cable anchoring body 40. The cable anchoring body can have a metal construction and in certain examples can have a caste metal construction. The cable anchoring body 40 is depicted affixed to a mounting interface 46. For example, the cable anchoring body 40 can be secured to the mounting interface 46 by a snap-fit connection, by fasteners, or by over-molding the mounting interface 46 onto the cable anchoring body 40. In one example, the mounting interface 46 has a molded plastic construction. In the depicted example, the mounting interface 46 is configured to engage with a structure within an enclosure for anchoring the cables relative to a housing of the enclosure. For example, the mounting interface 46 is adapted to mate with corresponding mounting structures provided at the mounting locations 22 of the cable anchoring bracket 24. As shown at FIGS. 6A-6C, the mounting locations 22 incudes rails 48 adapted to be received within side grooves 50 of the mounting interface 46. In another example, the rails can be provided on the mounting interface 46 and the grooves can be provided at the mounting locations 22. In a preferred example, the cable is secured to the cable anchoring body 40 prior to the cable anchoring body 40 being secured to the mounting interface 46.

Figure 22:
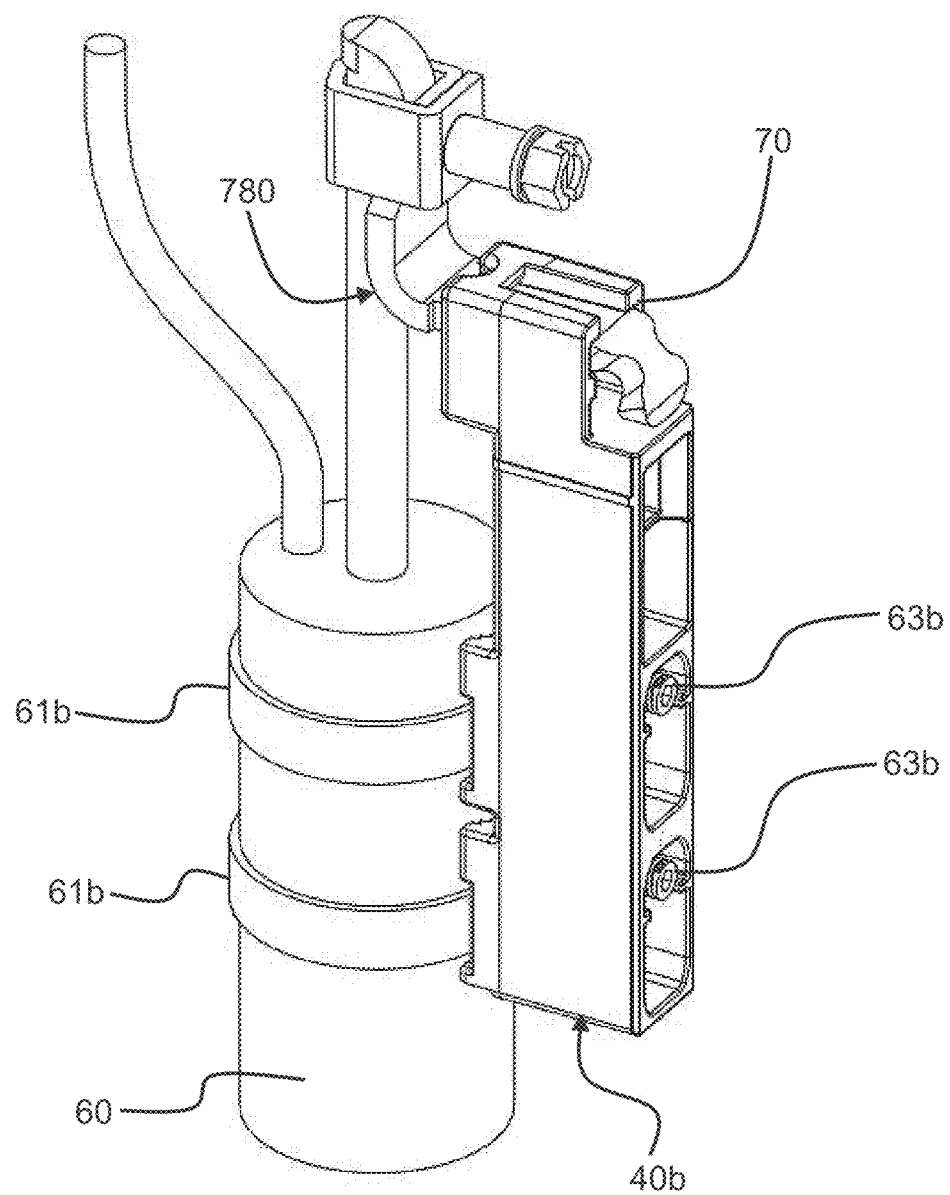
FIG. 22 depicts a cable anchoring system in accordance with the principles of the present disclosure including an alternative adjustable attachment slidably mounted within one of the cable anchoring bodies of FIG. 3.

The cable anchoring body 40 includes a cable strapping location 52 adjacent the first end 42. FIG. 3 also shows anchoring bodies 40a, 40b having slightly modified cable strapping locations. The cable strapping location 52 includes structure for facilitating strapping a cable to the cable anchoring body 40 using strap-type retention such as cable ties, hose clamps or the like. In the depicted example, the cable strapping location 52 includes cable-receiving recesses 54 including gripping projections such as knurling or the like for engaging the and pressing into the jacket of a cable mounted at the cable strapping location 52. The cable anchoring body 52 defines strap slots 56 adjacent each of the recesses 54 for receiving straps 61 for strapping a cable within the recesses 54. In other examples, cable anchoring bodies in accordance with the principles of the present disclosure include at least one cable-receiving recess and at least one strap slot 56. FIG. 1 depicts the cable 60 strapped at the cable strapping location 52 by straps 61. The straps 61 can be straps integrated as part of hose clamps and are shown routed around the cable 60 and through the strap slots 56. The cable 60 includes a jacket 63 about which the straps 61 are tightened. The cable 60 also includes a strength member 65 which may include a metal strength member or a strength member such as a glass-reinforced polymeric rod. The cable 60 can include at least one optical fiber 66, but typically would include a plurality of optical fibers. The optical fibers 66 can be protected within buffer tubes 67 routed from the end of the anchored cable to a location (e.g., trays) within the enclosure to which the cable 60 is anchored. Anchoring body 40b includes a cable strapping location 52b that including two recesses each including a cable securement strap 61b (see FIG. 22) and a tightening mechanism 63b (an Allen key as shown at FIG. 22) integrated within the body 40b for tightening the cable securement strap 61b. Anchoring body 40a includes one recess including strap slots 56 for use with a hose clamp and a second recess having a strap with integrated strap tightening.

The cable anchoring body 40 defines a slot 70 adjacent the second end 42 of the cable anchoring body 40. The slot 70 extends through the cable anchoring body 40 in a direction transverse with respect to the length L of the cable anchoring body 40. The cable anchoring system 20 includes an anchoring attachment 80 that adjustably (e.g., slidably) mounts within the slot 70 to as to be adjustable in a transverse direction relative to the cable anchoring body 40. A clamping device 79 is used to clamp the strength member 65 of the cable 60 to the anchoring attachment 80. Often the strength member 65 is centered within the cable 60 so that an offset distance OD (see FIG. 4) of a center of the strength member 65 relative to the cable anchoring body 40 is dependent upon the diameter of the cable. The transverse adjustability of the anchoring attachment allows the offset location relative to the cable anchoring body 40 at which the strength member 65 is clamped to be adjusted in the transverse orientation to match the location of the strength member 65 determined by the size of the cable being anchored. In certain examples, the anchoring attachment 80 can be used with clamping devices 79 having different sizes.

Figure 2:
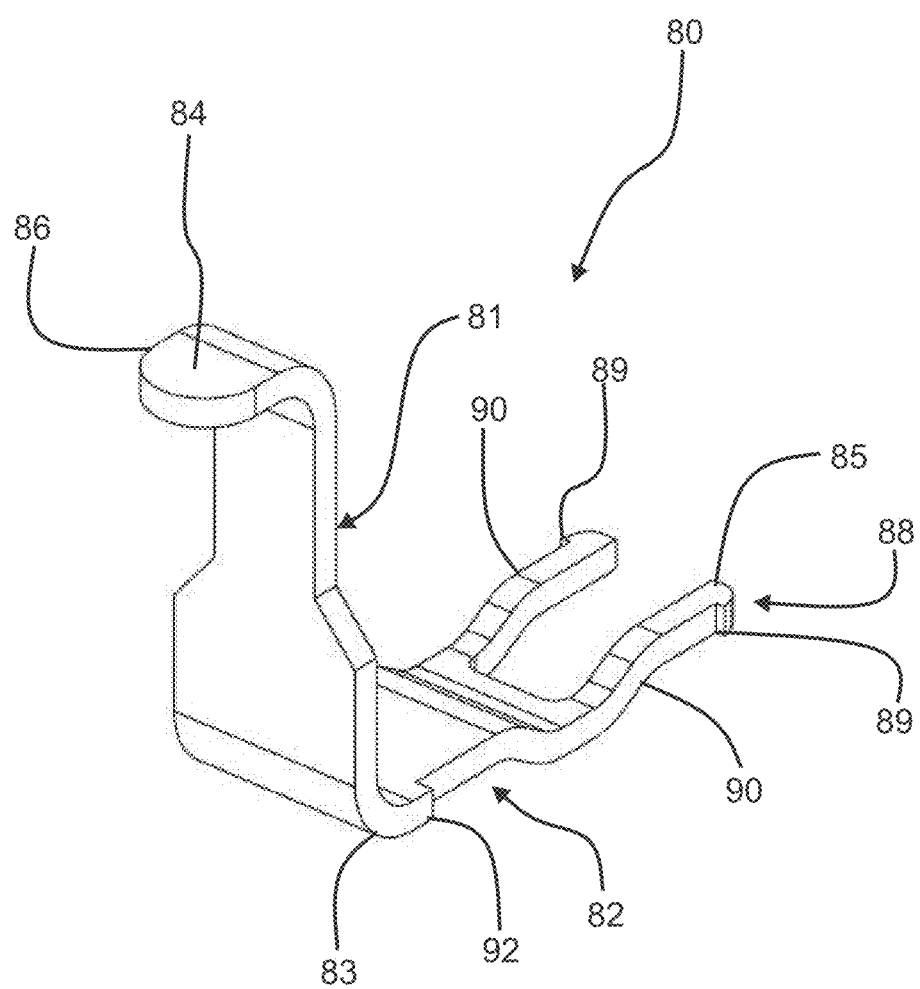
FIG. 2 is a perspective view of an adjustable attachment of the cable anchoring system of FIG. 1.

As depicted at FIG. 2, anchoring attachment 80 has first and second legs 81, 82 that are transversely oriented relative to one another and unitarily connected at a bend 83. The first and second legs 81, 82 respectively have free ends 84, 85. The free end 84 of the first leg 81 includes a tab 86 for opposing an end 87 of the strength member 65. The free end 85 of the second leg 82 includes a slide stop 88. The second leg 82 is adapted to be inserted through the slot 70 and is slidably moveable within the slot 70 along the transverse orientation. The transverse orientation extends along a length of the second leg 82 when the second leg is positioned within the slot 70. The slide stop 88 of the second leg 82 is configured to engage a corresponding stop structure of the cable anchoring body to limit sliding movement of the anchoring attachment 80 relative to the cable anchoring body 40 in a direction away from the cable anchoring body 40. In the depicted example, the slide stop 88 has a snap-fit configuration adapted to snap through the slot 70 when the second leg 82 is inserted through the slot 70. The slide stop 88 includes stops 89 that snap outwardly to a retaining position once the second leg has been inserted a sufficient length through the slot 70. When in the retaining position, the stops 89 oppose a back side of the cable anchoring body 40 to limit a distance the second leg 81 can be extended outwardly from the cable anchoring body 40. In the depicted example, the slide stop 88 has a forked configuration with the stops 89 being provided on separate tines 90 of the forked configuration. When the second leg 82 is inserted in the slot, the tines 90 resiliently flex (e.g., elastically) toward one another via contact with side walls of the slot 70 from a neutral state (i.e., non-flexed or non-deformed state) to allow passage of the stops 89 through the slot 70. Once the stops 89 pass through the slot 70, the inherent resiliency and spring load on flexed tines 90 causes the tines 90 to spring outwardly back toward the neutral state thereby bringing the stops 89 to the retaining position. The second leg 82 also includes a stop 92 that limits the distance the second leg 82 can be inserted into the slot 70. Thus, sliding movement of the second leg 82 within the slot 70 is limited by the stops 92, 89 with the range of sliding movement being defined by the stops 92, 89.

Figure 4:
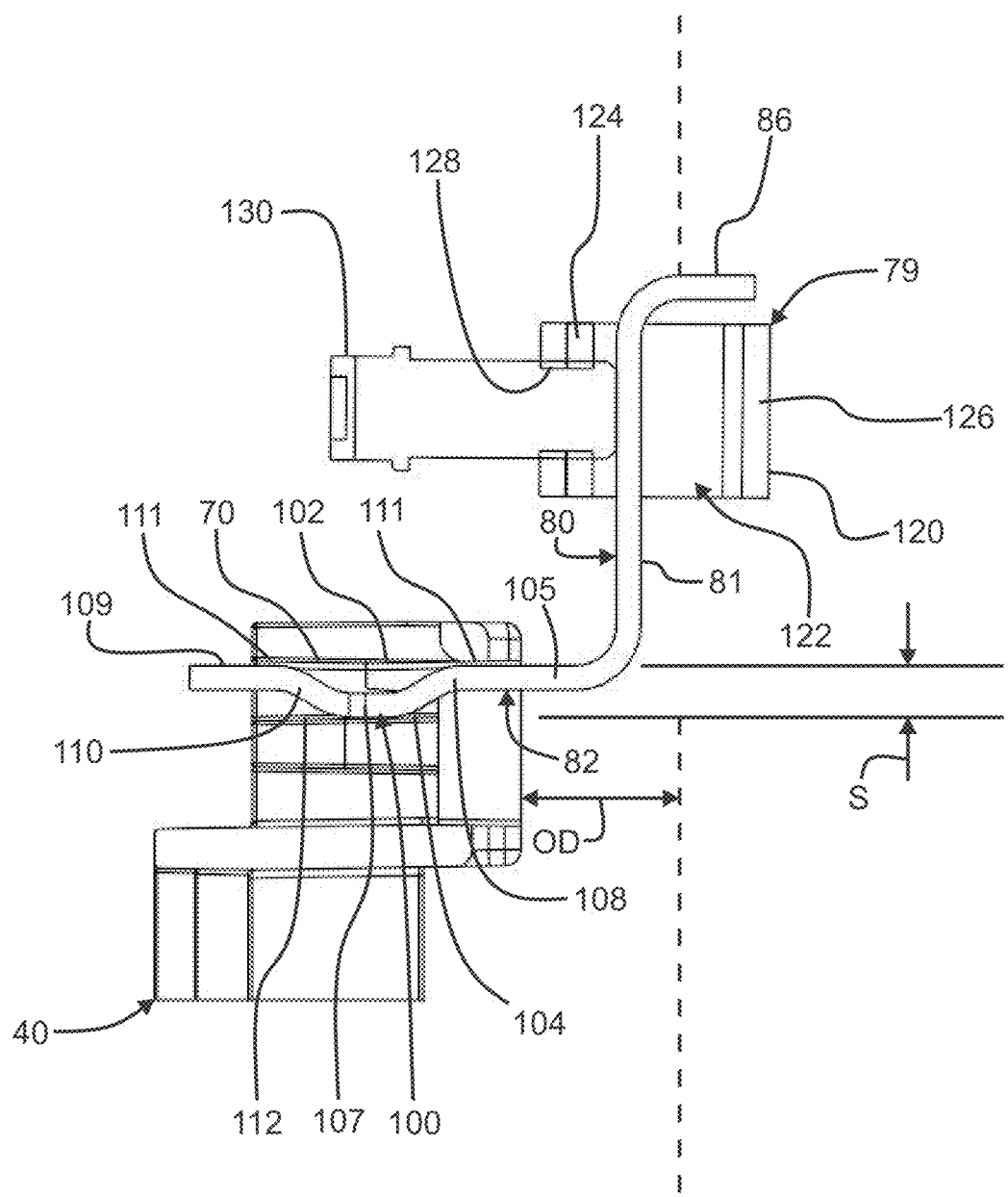
FIG. 4 is a partial cross-sectional view showing a slidable adjustment interface between the adjustable attachment of FIG. 2 and one of the cable anchoring bodies of FIG. 3.

As described above, the second leg 82 is configured to be slidably received within the slot 70 of the cable anchoring body 40. The second leg 82 and the slot 70 of the cable anchoring body 40 are relatively sized and shaped such that a deformable portion 100 of the second leg 82 deforms when the second leg 82 is inserted in the slot 70 to enhance friction between the cable anchoring body 40 and the second leg 82 within the slot 70 that resists sliding movement of the second leg 82 relative to the cable anchoring body 40. The friction assists in retaining the anchoring attachment 80 at a desired offset position. During insertion, the deformable portion 100 elastically deforms between opposing slot-defining surfaces 102, 104 of the cable anchoring body such that spring load is applied between the deformable portion 100 and the surfaces 102, 104 that enhances friction between the second leg 82 and the cable anchoring body 40. As shown at FIG. 4, the deformable portion 100 of the second leg 82 includes a first leg section 105 connected to a second leg section 107 by a jog 108 that offsets first leg section 105 from the second leg section 107. The deformable portion 100 also includes a third leg section 109 connected to the second leg section 107 by a jog 110. The second legs section 107 and the jogs 108, 110 form a deformable bump that projects downwardly from the first and third leg sections 105, 109. The first and third leg sections 105, 109 include first bearing surfaces 111 that face in a first direction and the second leg section 017 includes a second bearing surface 112 that faces in a second direction opposite from the first direction. A spacing S is defined between the first bearing surfaces 111 and the second bearing surface 112. When the second leg 82 is installed in the slot 70, the first bearing surfaces 111 engage the slot-defining surface 102 and the second bearing surface 112 engage the slot-defining surface 104. During insertion of the second leg 82 into the slot 70, the deformable portion 100 is compressed between the surfaces 102, 104 causing the deformable portion 100 to elastically deform to reduce the spacing S between the bearing surfaces 111, 112. This elastic deformation generates internal spring load that biases the bearing surfaces 111, 112 away from one another against their corresponding slot-defining surfaces 102, 104 creating increased normal force between the bearing surfaces 111, 112 and the corresponding slot-defining surfaces 102, 104 thereby increasing friction between the leg 82 and the cable anchoring body 40. In the depicted example, the anchoring attachment 80 has a bent metal construction such as a stamped, bent sheet-metal construction. The configuration of the deformable portion 100 also allows the second leg 82 to traverse the entire spacing S despite the material thickness of the second leg 82 being less than the spacing S. The smaller material thickness allows for a greater range of sliding movement of the anchoring attachment 80 relative to the body 40 as compared to a thicker attachment having the same length of the second leg 82.

In the depicted example, the clamping device 79 includes an anchoring sleeve 120 adapted to be mounted on the first leg 81 of the anchoring attachment 80. The anchoring sleeve 120 includes a through passage 122 for receiving the first leg 81 and the strength member 65. The passage 122 is defined in part by a first wall 124 and an opposite second wall 126. The anchoring sleeve defines a threaded opening 128 through the first wall 124. A threaded fastener 130 (e.g., a bolt or screw) threads within the threaded opening 128 of the anchoring sleeve 120 for clamping the strength member 65 of the cable 60 within the sleeve 120 with respect to the first leg 81 of the anchoring attachment 80. The end of the threaded fastener 130 can compress against the first leg 81 to cause the strength member 65 to be clamped between the first leg 81 and the second wall 126 of the sleeve 120.

Figures 11, 12:
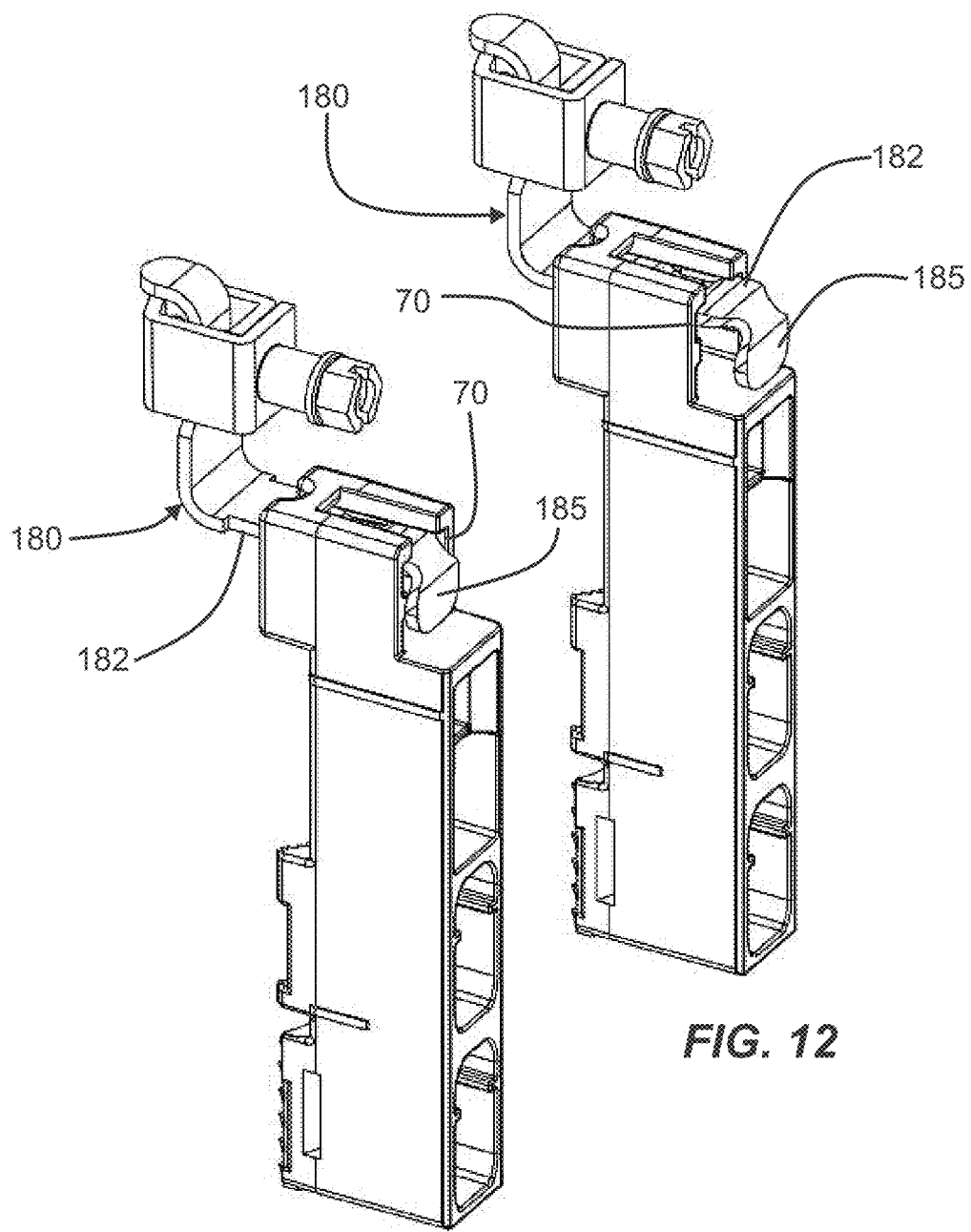
FIG. 11 depicts the adjustable attachment of FIG. 7 in a fully extended position relative to the cable anchoring body of FIG. 3.
FIG. 12 depicts the adjustable attachment of FIG. 7 in a fully retracted position relative to the cable anchoring body of FIG. 3.

FIGS. 7-12 depict an alternative anchoring attachment 180 in accordance with the principles of the present disclosure. At FIG. 7, the anchoring attachment 180 is shown installed in the slot 70 of the cable anchoring body 40a. The anchor attachment 180 has the same configuration as the anchoring attachment 80, except an alternative slide stop 185 has been provided at a free end of a second leg 182 of the attachment 180. The slide stop 185 is configured to be bent (e.g., bent by hand or with a tool) from an insertion position (as shown at FIG. 9) in which the second leg 182 of the anchoring attachment 180 can be inserted through the slot 70 to a retaining position (see FIGS. 7 and 9) in which the slide stop 185 is adapted to oppose a back side of the cable anchoring body 40 to limit an amount the anchoring attachment can be extended from the cable anchoring body 40. The slide stop 182 is depicted as a tab connected to a main body of the second leg 182 by a pre-defined bend location 187. The pre-defined bend location 187 is defined by side notches 189 that neck-down the width of the attachment 180 at the pre-defined bend location 187. The pre-defined bend location 187 is bent beyond its elastic limit (e.g., it inelastically deforms) when the slide stop 185 is bent between the insertion and the retaining positions. FIG. 11 shows the anchoring attachment 180 fully extended and FIG. 12 shows the anchoring attachment 180 fully retracted relative to the cable anchoring body 40. The side notches 189 provide clearance for maximizing the extension distance of the anchoring attachment 180. As depicted, the slide stop 185 is bent down from the insertion to the retention position. In other examples, a slide stop 185a can be bent up from the insertion position to the retaining position (see FIG. 19).

FIGS. 13 and 14 depict an alternative anchoring attachment 280 in accordance with the principles of the present disclosure. The anchoring attachment 280 has the same configuration as the anchoring attachment 180 except a pre-defined bend location 287 for inelastically bending slide stop 285 between an insertion position (see FIG. 13) and a retaining position (see FIG. 14) is defined by an elongate opening 291 defined along a longitudinal centerline of a second leg 282 of the anchoring attachment 280. The opening 291 is elongate in an orientation along the centerline of the leg 282.

FIGS. 15 and 16 depict an alternative anchoring attachment 380 in accordance with the principles of the present disclosure. The anchoring attachment 380 has the same configuration as the anchoring attachment 180 except a pre-defined bend location 387 for inelastically bending slide stop 385 between an insertion position (see FIG. 15) and a retaining position (see FIG. 16) is defined by circular opening 391 defined along a longitudinal centerline of a second leg 382 of the anchoring attachment 380.

FIGS. 17 and 18 depict an alternative anchoring attachment 480 in accordance with the principles of the present disclosure. The anchoring attachment 480 has the same configuration as the anchoring attachment 380 except the attachment 480 has a deformation bump 493 that extends upwardly as compared to downwardly. The deformation bump 493 increases friction between the attachment 480 and the cable anchoring body 40.

FIG. 20 depicts an alternative anchoring attachment 580 in accordance with the principles of the present disclosure. The anchoring attachment 580 has the same configuration as the anchoring attachment 380 except the attachment 580 has resiliently deformable, parallel side rails 593 on opposite sides of the second leg of the attachment 580 for increasing friction between the attachment 580 and the cable anchoring body 40.

FIG. 21 depicts an alternative anchoring attachment 680 in accordance with the principles of the present disclosure. The anchoring attachment 680 has the same configuration as the anchoring attachment 580 except the attachment 680 has resiliently deformable, tabs 693 on opposite sides of the second leg of the attachment 680 for increasing friction between the attachment 680 and the cable anchoring body 40.

Figure 23:
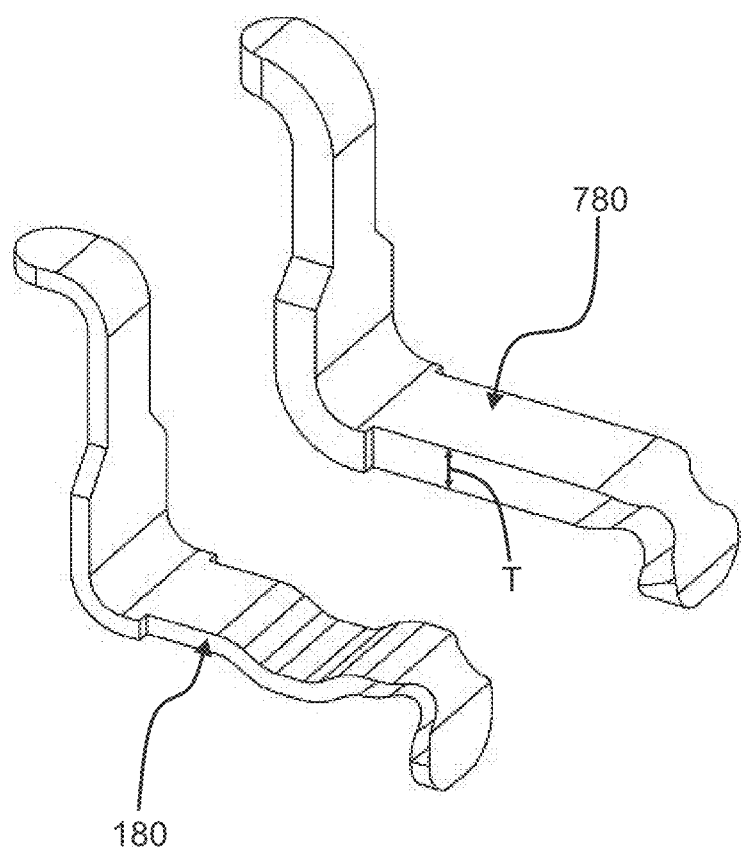
FIG. 23 is a perspective view showing a comparative leg thickness of the adjustable attachment of FIG. 7 and the adjustable attachment of FIG. 23.
Figure 24:
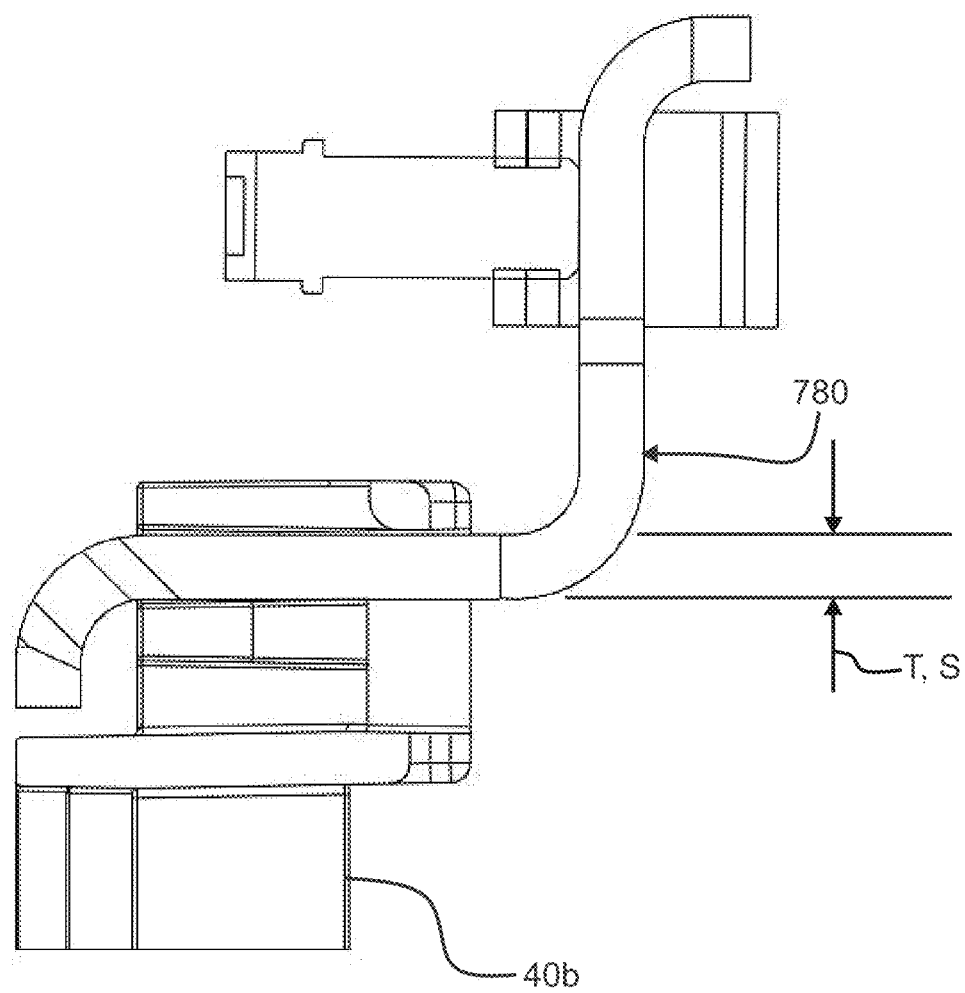
FIG. 24 is a cross-sectional view through a portion of FIG. 22 depicting the slide interface between the adjustable attachment and the cable anchoring body.

FIGS. 22-24 depict another anchoring attachment 780 in accordance with the principles of the present disclosure. At FIG. 22, the anchoring attachment 780 is shown installed in the slot 70 of the cable anchoring body 40b. The anchor attachment 780 has the same configuration as the anchoring attachment 180, except the deformable portion has been eliminated. Instead, the anchoring attachment 780 has a material thickness T that matches (e.g., is slightly smaller than) the spacing S of the slot 70 (see FIG. 24) such that the material thickness T takes up the spacing of the slot S without requiring deformation. As shown at FIG. 23, the material thickness T of the anchoring attachment 780 is substantially larger than the material thickness of the anchoring attachment 180.

Having shown and described aspects and implementations of the present disclosure, it will be appreciated that the depicted and described aspects and implementations are merely examples of how certain concepts may be put into practice and are not intended to limit such concepts to the details of any particular aspect or implementation.

What is claimed is:

1. A cable anchoring system for securing a cable to another structure, the cable anchoring system comprising:

a cable anchoring body that is elongate along a length that extends between first and second opposite ends of the cable anchoring body, the cable anchoring body including a cable strapping location adjacent the first end, the cable anchoring body defining a slot adjacent the second end that extends through the cable anchoring body in a direction transverse with respect to the length of the cable anchoring body;

an anchoring attachment having first and second legs that are transversely oriented relative to one another and unitarily connected at a bend, the first and second legs each having a free end, the free end of the first leg including a tab and the free end of the second leg including a slide stop, the second leg being configured to be slidably received within the slot of the cable anchoring body, the second leg including an intermediate friction increasing portion positioned within the slot, the intermediate friction increasing portion including a deformable portion, the deformable portion defining a bend contacting opposite surfaces of the slot, the second leg and the slot of the cable anchoring body being relatively sized and shaped such that the deformable portion of the second leg deforms when the second leg is inserted in the slot to enhance friction between the cable anchoring body and the second leg within the slot that resists sliding movement of the second leg relative to the cable anchoring body, the slide stop of the second leg being configured to engage a corresponding stop structure of the cable anchoring body to limit sliding movement of the anchoring attachment relative to the cable anchoring body in a direction away from the cable anchoring body and preventing withdrawal of the second leg from the slot;

an anchoring sleeve adapted to be mounted on the first leg of the anchoring attachment, the anchoring sleeve defining a threaded opening; and a threaded fastener that threads within the threaded opening of the anchoring sleeve for clamping a strength member of the cable with respect to the first leg of the anchoring attachment.

2. The cable anchoring system of claim 1, wherein the anchoring attachment has a bent metal construction.

3. The cable anchoring system of claim 1, wherein the anchoring attachment has a stamped, bent sheet-metal construction.

4. The cable anchoring system of claim 1, wherein the deformable portion of the second leg includes a first leg section connected to a second leg section by a jog that offsets the first leg section from the second leg section.

5. The cable anchoring system of claim 4, wherein the first leg section includes a first bearing surface that faces in a first direction and the second leg section includes a second bearing surface that faces in a second direction opposite from the first direction.

6. The cable anchoring system of claim 1, wherein the deformable portion includes deformable side projections that project from opposite sides of the second leg.

7. The cable anchoring system of claim 6, wherein the deformable side projections include tabs.

8. The cable anchoring system of claim 7, wherein the deformable side projections include elongate rails.

9. The cable anchoring system of claim 1, wherein the slide stop is configured to snap through the slot when the second leg is inserted through the slot.

10. The cable anchoring system of claim 1, wherein the slide stop is configured to be manually bent to a stop position once the second leg has been inserted through the slot.

11. The cable anchoring system of claim 10, wherein the slide stop includes a stop tab connected to a main body of the second leg by a necked-down portion.

12. The cable anchoring system of claim 10, wherein the slide stop includes a stop tab connected to a main body of the second leg by a bendable portion in which an opening is defined.

13. A cable anchoring system for securing a cable to another structure, the cable anchoring system comprising:
   a cable anchoring body that is elongate along a length that extends between first and second opposite ends of the cable anchoring body, the cable anchoring body including a cable strapping location adjacent the first end, the cable anchoring body defining a slot adjacent the second end that extends through the cable anchoring body in a direction transverse with respect to the length of the cable anchoring body;
   an anchoring attachment having first and second legs that are transversely oriented relative to one another and unitarily connected at a bend, the first and second legs each having a free end, the free end of the first leg including a first tab and the free end of the second leg including a slide stop, the second leg being configured to be slidably received within the slot of the cable anchoring body, the second leg including an intermediate friction increasing portion positioned within the slot, the intermediate friction increasing portion including a deformable portion, the deformable portion defining a bend contacting opposite surfaces of the slot creating friction between the cable anchoring body and the second leg, the slide stop of the second leg being configured to engage a corresponding stop structure of the cable anchoring body to limit sliding movement of the anchoring attachment relative to the cable anchoring body in a direction away from the cable anchoring body and preventing withdrawal of the second leg from the slot;
   an anchoring sleeve adapted to be mounted on the first leg of the anchoring attachment, the anchoring sleeve defining a threaded opening; and
   a threaded fastener that threads within the threaded opening of the anchoring sleeve for clamping a strength member of the cable with respect to the first leg of the anchoring attachment.

14. The cable anchoring system of claim 13, wherein the stop structure includes a snap-fit feature.

15. The cable anchoring system of claim 13, wherein the stop structure includes a second tab which is moved to and retained in a stopping position by inelastically deforming and bending a bendable portion of the second leg.

* * * * *